United States Patent
Liu

(10) Patent No.: US 11,579,831 B2
(45) Date of Patent: Feb. 14, 2023

(54) INTELLIGENT INTERACTIVE ALL-IN-ONE MACHINE

(71) Applicants: Guangzhou Shiyuan Electronic Technology Company Limited, Guangzhou (CN); Guanzhou Shirui Electronics Co., Ltd., Guangdong (CN)

(72) Inventor: Wei Liu, Guangdong (CN)

(73) Assignees: Guangzhou Shiyuan Electronic Technology Company Limited, Guangzhou (CN); Guanzhou Shirui Electronics Co., Ltd., Guangzhou (CN)

( * ) Notice: Subject to any disclaimer, the term of this patent is extended or adjusted under 35 U.S.C. 154(b) by 0 days.

(21) Appl. No.: 17/047,950

(22) PCT Filed: Nov. 30, 2018

(86) PCT No.: PCT/CN2018/118479
§ 371 (c)(1),
(2) Date: Oct. 15, 2020

(87) PCT Pub. No.: WO2019/200928
PCT Pub. Date: Oct. 24, 2019

(65) Prior Publication Data
US 2021/0173609 A1    Jun. 10, 2021

(30) Foreign Application Priority Data
Apr. 17, 2018 (CN) .......................... 201810343348.9

(51) Int. Cl.
*G06F 3/14* (2006.01)
*G06F 3/0488* (2022.01)
(Continued)

(52) U.S. Cl.
CPC .......... *G06F 3/1454* (2013.01); *G06F 3/0488* (2013.01); *H04L 65/764* (2022.05);
(Continued)

(58) Field of Classification Search
CPC ..... G06F 3/1454; G06F 3/0488; H04L 65/60; H04L 65/05; H04L 65/604; H04N 7/15
See application file for complete search history.

(56) References Cited

U.S. PATENT DOCUMENTS

2003/0097428 A1    5/2003   Afkhami et al.
2003/0101275 A1    5/2003   Maciel
(Continued)

FOREIGN PATENT DOCUMENTS

CN          204539375 U      8/2015
CN          205389209 U      7/2016
(Continued)

OTHER PUBLICATIONS

ISR for International Application PCT/CN2018/118479 dated Feb. 17, 2019.
(Continued)

*Primary Examiner* — Shaheda A Abdin
(74) *Attorney, Agent, or Firm* — Ladas & Parry LLP

(57) ABSTRACT

The present invention, belonging to the technical field of data transmission, relates to an integrated intelligent interaction machine. The integrated intelligent interaction machine comprises a signal transmission device, a processing device, a upper computer and a network transmission device, wherein the signal transmission device is connected to the processing device, the processing device is connected to the upper computer, and the upper computer is connected to the processing device through the network transmission device. The signal transmission device is used to receive a screen transmission signal and transmit it to the processing device, and the processing device is used to process the screen transmission signal to obtain screen transmission data and transmit the screen transmission data to the upper computer. The upper computer is used to connect to an external network and output a network signal to the network
(Continued)

transmission device, and the network transmission device transmits the network signal to the processing device. The upper computer is used to connect the external network and the internal device of the equipment to provide the network signal for the processing device, thereby realizing the communication between the processing device and the external network. The screen transmission data and the network signal are transmitted through different paths, so as to carry out screen transmission communication in the equipment and network sharing, respectively, thereby improving the data transmission convenience of the integrated intelligent interaction machine.

9 Claims, 3 Drawing Sheets

(51) Int. Cl.
    *H04N 7/15*     (2006.01)
    *H04L 65/75*     (2022.01)
    *H04L 67/131*     (2022.01)

(52) U.S. Cl.
    CPC .......... *H04L 65/765* (2022.05); *H04L 67/131* (2022.05); *H04N 7/15* (2013.01); *G09G 2370/025* (2013.01); *G09G 2370/16* (2013.01)

(56) References Cited

U.S. PATENT DOCUMENTS

| | | | | |
|---|---|---|---|---|
| 2004/0259640 | A1* | 12/2004 | Gentles | ................ G06F 21/128 463/42 |
| 2012/0287222 | A1* | 11/2012 | Liu | ................ G09G 5/003 348/14.07 |
| 2013/0147901 | A1* | 6/2013 | Weiser | ................ H04L 65/1053 348/14.08 |
| 2013/0290882 | A1* | 10/2013 | Cotte | ................ H04L 67/38 715/764 |
| 2014/0344876 | A1* | 11/2014 | Yao | ................ H04N 21/4307 725/110 |
| 2015/0091940 | A1 | 4/2015 | Emori | |

FOREIGN PATENT DOCUMENTS

| | | |
|---|---|---|
| CN | 205901982 U | 1/2017 |
| CN | 107453961 A | 12/2017 |
| CN | 108449360 A | 8/2018 |
| EP | 2866429 A1 | 4/2015 |

OTHER PUBLICATIONS

Written Opinion for International Application PCT/CN2018/118479.
CN 108449360 A _ English Translation.
CN 107453961 A _ English Translation.
CN 204539375 U _ English Translation.
CN 205389209 U _ English Translation.
CN 205901982 U _ English Translation.
Extended European Search Report of EP counterpart application 18915280.4-1213 | 3780534 dated Mar. 16, 2021.
Notice of Allowance for Chinese Patent Application No. 2018103433489, dated Mar. 17, 2021.

\* cited by examiner

INTELLIGENT INTERACTIVE ALL-IN-ONE MACHINE

RELATED APPLICATION

This application is an application under 35 U.S.C. 371 of International Application No PCT/CN2018/118479 filed on 30 Nov. 2018, which claims priority from Chinese Application No. 201810343348.9 filed 17 Apr. 2018, the disclosures of which are incorporated in their entirety by reference herein.

FIELD OF THE INVENTION

The present invention relates to the technical field of data transmission, and in particular to an integrated intelligent interaction machine.

BACKGROUND OF THE INVENTION

An integrated interaction machine, which uses a high-definition LCD screen as the display and operation platform, has functions such as writing, annotation, drawing, synchronous interaction, multimedia entertainment, and network conference integration, and combines multiple technologies such as high-definition display, human-computer interaction, multimedia information processing and network transmission, so as to provide the optimal solution for office, teaching, graphic interactive presentation in the information age.

In the conventional network communication mode of interaction machines, a main chip connects a wireless module and an external network to acquire wireless signals received by the wireless module, and the main chip is also connected with the module/chip directly or through a router, and the IP (Internet Protocol) of the module/chip is allocated by the main chip. When the module/chip needs to communicate with the external network, it is necessary to input the IP of the external network equipment, and because the two sides of the main chip belong to different network segments, the connection communication cannot be conducted. The conventional network communication mode of interaction machines has the disadvantage of low data transmission convenience.

SUMMARY OF THE INVENTION

On the basis of this, in order to solve the above-mentioned problems, it is necessary to provide an integrated intelligent interaction machine which can improve the data transmission convenience.

An integrated intelligent interaction machine comprises a processing device, a upper computer and a network transmission device, wherein the signal transmission device is connected to the processing device, the processing device is connected to the upper computer, and the upper computer is connected to the processing device through the network transmission device.

The upper computer is used to connect to an external network, and output a network signal to the network transmission device, and the network transmission device transmits the network signal to the processing device.

According to the above-mentioned integrated intelligent interaction machine, the upper computer is connected to the external network and transmits the network signal to the processing device through the network transmission device, and the upper computer is used to connect the external network and the internal device of the equipment so as to provide the network signal for the processing device, thereby realizing the communication between the processing device and the external network and simultaneous sharing of the network among different devices in the equipment, which improves the data transmission convenience of the integrated intelligent interaction machine.

DESCRIPTION OF THE PREFERRED EMBODIMENT

Figure 1:
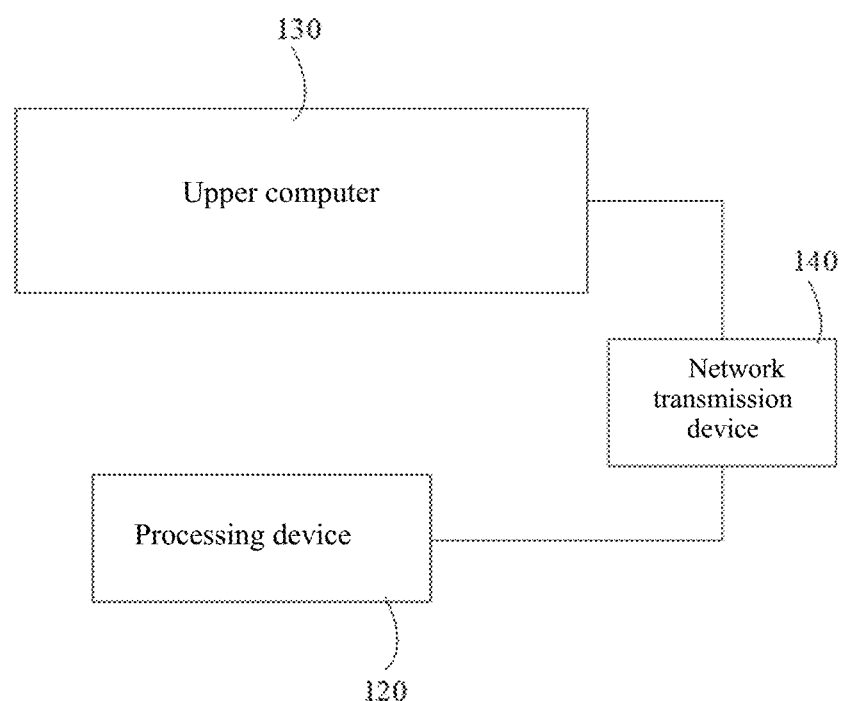
FIG. 1 is a structural diagram of an integrated intelligent interaction machine in an embodiment.

In one embodiment, as shown in FIG. 1, an integrated intelligent interaction machine comprises a processing device 120, a upper computer 130 and a network transmission device 140, wherein the upper computer 130 is connected to the processing device 120 through the network transmission device 140. The upper computer 130 is used to connect to an external network, and output a network signal to the network transmission device 140, and the network transmission device 140 transmits the network signal to the processing device 120.

The type of the external network connected to the upper computer 130 is not unique, which may be one or both of the external wired network and the external wireless network. The upper computer 130 serves as a router to connect the external network and the internal devices of the equipment, and the upper computer 130 transmits the network signal to the processing device 120 through the network transmission device 140, so that the processing device 120 is connected to a network for communication.

Figure 2:
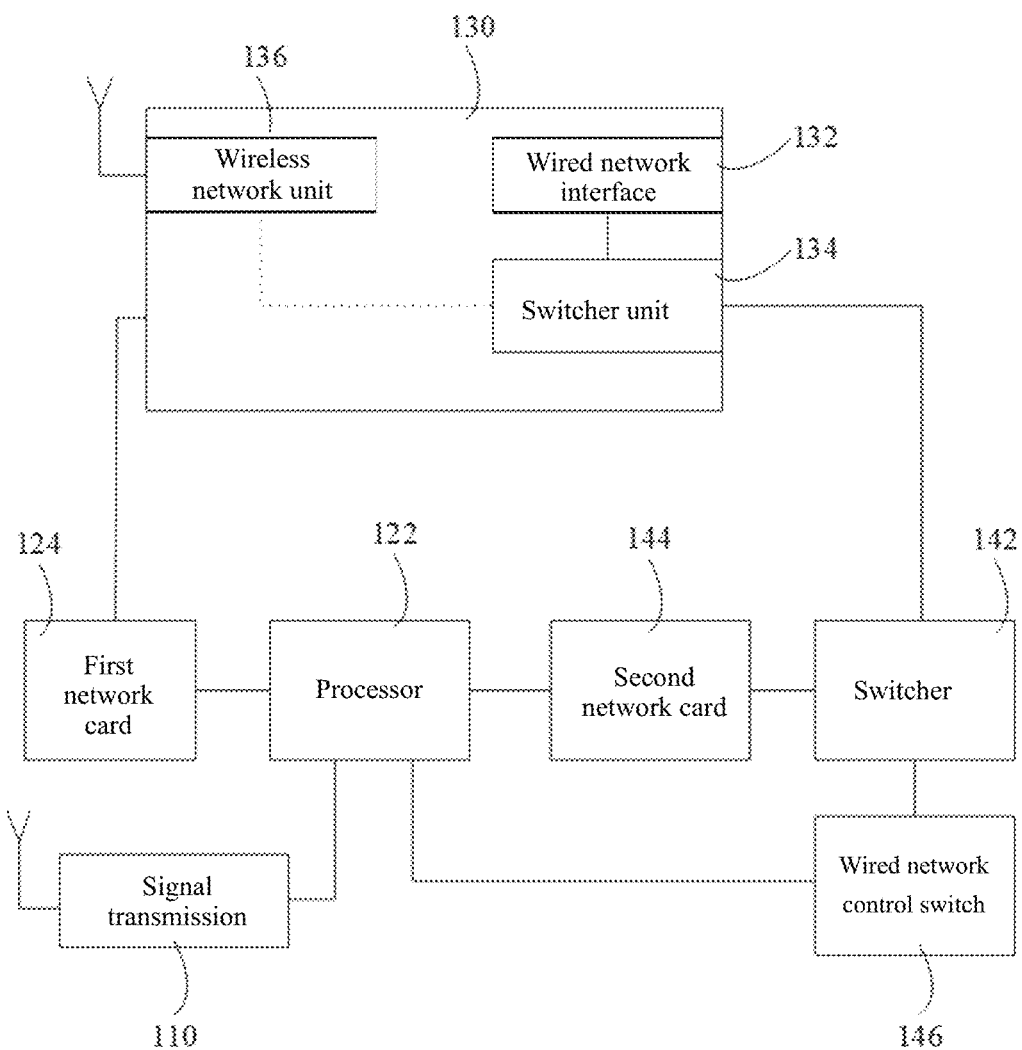
FIG. 2 is a structural diagram of an integrated intelligent interaction machine in another embodiment.

Furthermore, in one embodiment, as shown in FIG. 2, the integrated intelligent interaction machine may further comprises a signal transmission device 110 connected to the processing device 120, wherein the processing device 120 is connected to the upper computer 130. The signal transmission device 110 is used to receive a screen transmission signal and transmit it to the processing device 120, and the processing device 120 is used to process the screen transmission signal to obtain screen transmission data and transmit it to the upper computer 130.

Concretely, the signal transmission device 110 may be communicated with a terminal such as a mobile phone and a notebook computer to receive the screen transmission signal transmitted by the terminal, wherein the signal transmission device 110 and the terminal may be connected by wireless communication or wired communication. When a user needs to perform a screen transmission operation, after the terminal is connected to the signal transmission device 110, the screen transmission signal is transmitted to the signal transmission device 110 by the terminal, and the signal transmission device 110 forwards the received screen transmission signal to the processing device 120. The processing device 120 decodes the received screen transmission signal to obtain screen transmission data, and forwards the screen transmission data to the upper computer 130 for screen transmission display of multimedia information. The type of screen transmission data is not unique, which may include only video data, or may include both audio data and video data. After the upper computer 130 acquires the screen transmission data, the screen transmission data may be used by the internal software/services of the upper computer 130, for example, the internal software/service generates a video screen according to the screen transmission data and displays it on the display of the upper computer 130, and controls the speaker of the upper computer 130 for audio playback. In addition, the upper computer 130 can also forward the screen transmission data to an external device, so that the external device can perform screen transmission display of multimedia information. The external device may concretely be a television, a set-top box, or the like. The concrete type of the upper computer 130 is also not unique, which may be a PC (Personal Computer), a tablet computer, a touch computer, and the like. In this embodiment, the upper computer 130 is a PC.

In this embodiment, the processing device 120 processes the screen transmission signal received by the signal transmission device 110 to obtain the screen transmission data, and transmits the screen transmission data to the upper computer 130. The upper computer 130 is connected to the external network and transmits the network signal to the processing device 120 through the network transmission device 140, and the upper computer 130 is used to connect the external network and the internal device of the equipment to provide the network signal for the processing device 120, thereby realizing the communication between the processing device 120 and the external network. The screen transmission data and the network signal are transmitted through different paths, so as to carry out screen transmission communication in the equipment and network sharing, respectively. In addition, the processing device 120 may also output the network signal through the signal transmission device 110, so that the external terminal can connect to the network. By taking an example of the signal transmission device 110 being connected to the terminal through wireless communication, the processing device 120 provides a wireless network to the terminal through the signal transmission device 110, so that the operator can connect the terminal to the network for data communication.

The above-mentioned integrated intelligent interaction machine uses the upper computer 130 to connect the external network and the internal device of the equipment, so as to provide the network signal for the processing device 120, thereby realizing the communication between the processing device 120 and the external network and simultaneous sharing of the network among different devices in the equipment, which improves the data transmission convenience of the integrated intelligent interaction machine.

In one embodiment, the signal transmission device 110 is a wireless transmission device. The wireless transmission device receives a wireless screen transmission signal through an external antenna and transmits it to the processing device 120, and the processing device 120 decodes the wireless screen transmission signal to obtain the screen transmission data and forwards the screen transmission data to the upper computer 130. The screen transmission of multimedia information is performed wirelessly, which is not limited by the data line, so the operation is simple and fast. Concretely, the signal transmission device 110 may be a WIFI (Wireless Fidelity) device, a Bluetooth device, an infrared device, etc., and in this embodiment, the signal transmission device 110 is a WIFI device with a long signal transmission distance and high reliability.

The concrete structure of the processing device 120 is not unique. In one embodiment, as shown in FIG. 2, the processing device 120 includes a processor 122 and a first network card 124, wherein the processor 122 is connected to the signal transmission device 110 and the network transmission device 140, and is connected to the upper computer 130 through the first network card 124. The processor 122 processes the screen transmission signal received by the signal transmission device 110 to obtain the screen transmission data, and forwards the screen transmission data to the upper computer 130 through the first network card 124, and receives the network signal transmitted by the network transmission device 140 for network communication. Concretely, a main control chip may be adopted as the processor 122, and the connection relationship between the processor 122 and the signal transmission device 110 is not unique. In this embodiment, the processor 122 is connected to the signal transmission device 110 through a USB (Universal Serial Bus) interface.

The type of the first network card 124 is not unique. In this embodiment, the first network card 124 is a USB network card, and concretely, an RTL8152 chip may be used. Thereinto, the first network card 124 is connected to the processor 122 through an RJ45 interface, and is connected to the upper computer 130 through a USB interface. The processor 122 and the upper computer 130 are connected through a USB network card, which facilitates data transmission and improves the reliability.

According to the different types of the external network connected to the upper computer 130, the ways in which the upper computer 130 accesses to the external network and transmits the network signal via the network transmission device 140 are also different. In one embodiment, the external network includes an external wired network. Hereinafter as shown in FIG. 2, the upper computer 130 includes a wired network interface 132 and a switcher unit 134, wherein the switcher unit 134 is connected to the wired network interface 132, the processing device 120, and the network transmission device 140, and the switcher unit 134 is connected to an external wired network through the wired network interface 132, so as to output the network signal to the network transmission device 140.

Concretely, the switcher unit 134 is connected to the first network card 124 through a USB interface, receives the screen transmission data transmitted by the processor 122 through the first network card 124, and performs screen transmission processing of multimedia information. After accessing the wired network signal from the external wired network through the wired network interface 132, the switcher unit 134 outputs the network signal to the processor 122 in the processing device 120 via the network transmission device 140, so that the upper computer 130 and the processor 122 can be connected to the wired network, thereby realizing the internal screen transmission communication of the integrated intelligent interaction machine and wired network sharing, which improves the data transmission convenience of the integrated intelligent interaction machine.

Furthermore, in one embodiment, the external network also includes an external wireless network. The upper computer 130 also includes a wireless network unit 136 connected to the switcher unit 134, wherein the switcher unit 134 is also connected to the external wireless network through the wireless network unit 136. The switcher unit 134 outputs the network signal to the network transmission device 140 according to the accessed external wired network and/or accessed external wireless network.

The switcher unit 134 serves as a soft router to access the external wireless network signal through the wireless network unit 136, so that the processor 122 can be connected to the wireless network for communication. In this embodiment, the upper computer 130 provides wired network and wireless network access simultaneously, and shares the network through both the wired path and the wireless path. The operator can choose the network connection of the integrated intelligent interaction machine according to actual needs, which further improves the data transmission convenience of the integrated intelligent interaction machine. It can be understood that, in another embodiments, the upper computer 130 may also include only the switcher unit 134 and the wireless network unit 136, and access to the external wireless network through the wireless network unit 136 for the processor 122 to connect to the network.

Correspondingly, in one embodiment, as shown in FIG. 2, the network transmission device 140 includes a switcher 142 and a second network card 144, wherein the switcher 142 is connected to the switcher unit 134 of the upper computer 130, and is connected to the processing device 120 through the second network card 144, and concretely to the processor 122 of the processing device 120. The switcher 142 receives the network signal output by the switcher unit 134 of the upper computer 130 and forwards it to the processor 122 through the second network card 144. The manner in which the switcher 142 is connected to the switcher unit 134 is not unique. In this embodiment, the switcher 142 is connected to the switcher unit 134 through an RJ45 interface.

The type of the second network card 144 is also not unique. In this embodiment, the second network card 144 is a USB network card, and concretely, an RTL8152 chip or an RTL8153 chip may be used. Thereinto, the second network card 144 is connected to the switcher 142 through an RJ45 interface, and is connected to the processor 122 through a USB interface.

In addition, in one embodiment, the network transmission device 140 further includes a wired network control switch 146, which is connected to the switcher 142 and the processing device 120, specifically to the processor 122 of the processing device 120.

The processor 122 is also used to output a control signal to the wired network control switch 146, and the wired network control switch 146, according to the control signal, controls the on/off of the network signal accessed from the external wired network in the switcher 142. For example, when the upper computer 130 is simultaneously connected to the external wired network and the external wireless network, if the network signal is accessed from the external wireless network, the wired network control switch 146 can control the switcher 142 to prevent it from transmitting the network signal accessed from the external wired network to the processor 122, so that the processor 122 can only receive the signal accessed from the external wireless network, which avoids interference caused by the processor 122 simultaneously accessing signals from two different external networks, thereby improving network connection reliability. When no network signal is accessed from the external wireless network, the wired network control switch 146 can control the switch 142 to transmit the network signal accessed from the external wired network to the processor 122. In addition, the wired network control switch 146 can also control the on/off of the network signal accessed from the external wired network according to a received external switching command. According to the different types of the external wired network, the types of the wired network interface 132 and the wired network control switch 146 are also different. In this embodiment, the wired network interface 132 is an Ethernet interface, and the wired network control switch 146 is an Ethernet control switch. The Ethernet interface is connected to the external Ethernet to access the network signal, and the Ethernet control switch control the on/off of the network signal accessed by the switcher 142 from the external Ethernet.

Figure 3:
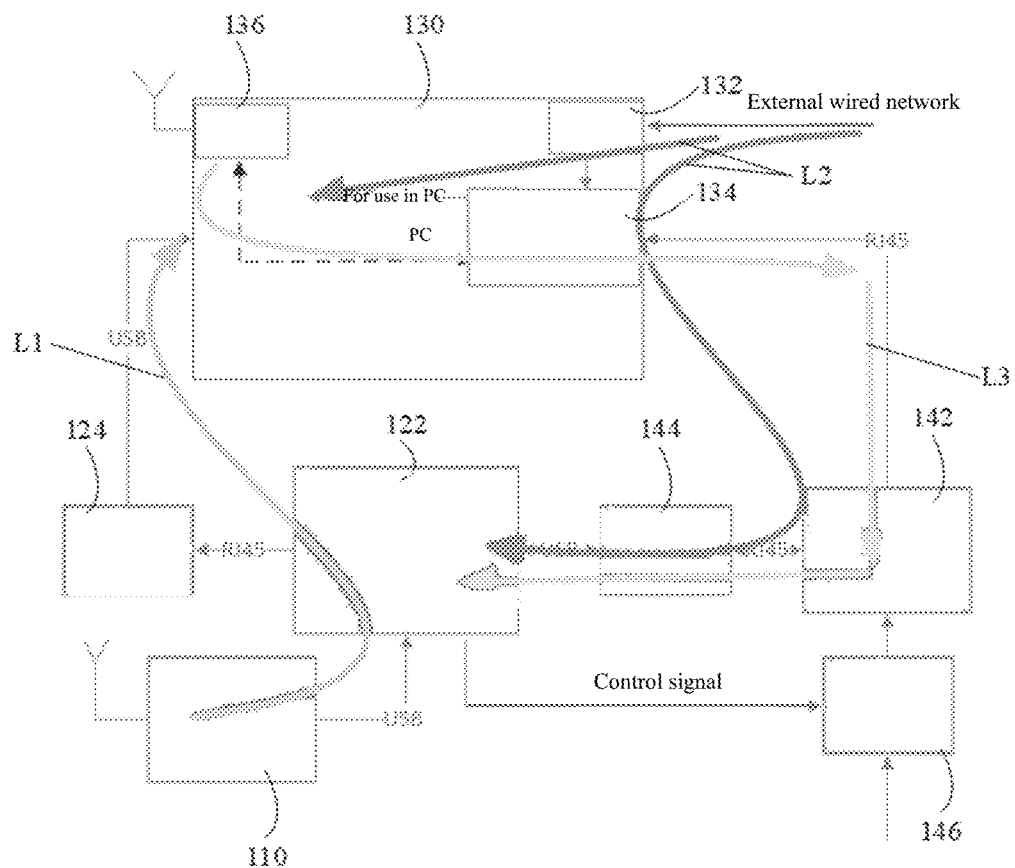
FIG. 3 is a schematic diagram of an integrated intelligent interaction machine in an embodiment.

In one embodiment, as shown in FIG. 3, an integrated intelligent interaction machine includes a signal transmission device 110, a processor 122, a first network card 124, a upper computer 130, a switcher 142, a second network card 144, and a wired network control switch 146, wherein the upper computer 130 includes a wired network interface 132, a wireless network unit 136 and a switcher unit 134. The signal transmission device 110 is connected to the processor 122. The switcher unit 134 of the upper computer 130 is connected to the wired network interface 132, the wireless network unit 136 and the switcher 142, and is connected to the processor 122 through the first network card 124. The wired network interface 132 is used to connect the external wired network. The wireless network unit 134 is used to connect the external wireless network. The switcher 142 is connected to the processor 122 through the second network card 144, and the wired network control switch 146 is connected to the switcher 142 and the processor 122.

The signal transmission device 110 is used to receive the screen transmission signal and transmit it to the processor 122, and the processor 122 is used to process the screen transmission signal to obtain the screen transmission data, and transmit the screen transmission data to the switcher unit 134 of the upper computer 130 through the first network card 124. The switcher unit 134 of the upper computer 130 outputs the network signal to the switcher 142 according to the accessed external wired network and/or accessed external wireless network, and the switcher 142 transmits the network signal to the processor 122 through the second network card 144. The wired network control switch 146 is used to control the on/off of the network signal accessed by the switch 142 from the external wired network according to the control signal transmitted by the processor 122.

Thereinto, a PC is adopted as the upper computer 130, WIFI modules are adopted as the signal transmission device 110 and the wireless network unit 136, a main control chip is adopted as the processor 122, USB network cards are adopted as the first network card 124 and the second network card 144, and an Ethernet interface is adopted as the wired network interface 132, and an Ethernet control switch is adopted as the wired network control switch 146. The signal transmission device 110 is connected to the processor 122 through the USB interface, the processor 122 is connected to the first network card 124 through the RJ45 interface, and the first network card 124 is connected to the upper computer 130 through the USB interface. The switcher 142 is connected to the switcher unit 134 through the RJ45 interface, the second network card 144 is connected through the RJ45 interface, and the second network card 144 is connected to the processor 122 through the USB interface.

Concretely, a path L1 is used for the internal communication of the equipment. After the signal transmission device 110 receives the screen transmission signal, it is processed by the processor 122 and then transmitted along the path L1, and concretely, the screen transmission data is transmitted to the upper computer 130 via the first network card 124, so that software/services on the upper computer 130 can use the screen transmission data. A path L2 represents wired network sharing. The external wired network is accessed from the wired network interface 132, and transmits along the path L2, and concretely via the switcher unit 134, the switcher 142, the second network card 144 and the processor 122. It can be seen that both the upper computer 130 and the processor 122 can obtain the wired network signal. A path L3 represents wireless network sharing. The external wireless network is accessed from the wireless network unit 136, and transmits along the path L3, and concretely via the switcher unit 134, the switcher 142, the second network card 144 and the processor 122. The upper computer 130 serves as soft routing, and it can be seen that the processor 122 can also acquire the network signal.

Through three different paths of screen communication in the equipment, wired network sharing and wireless network sharing respectively, it realizes the multimedia information screen transmission operation of the integrated intelligent interaction machine and the communication with the external network, thereby improving the data transmission convenience of the integrated intelligent interaction machine.

The respective technical features of the above-mentioned embodiments can be combined arbitrarily. In order to make the description concise, all possible combinations of the technical features in the above-mentioned embodiments are not described. However, as long as there is no contradiction in the combination of these technical features, all should be considered as the scope of this description.

The above-mentioned embodiments only describe several embodiments of the present invention, and the descriptions are more concrete and detailed, but they should not be understood as limiting the scope of the invention patent. It should be pointed out that for those skilled in the art, several modifications and improvements can be made under the premise of not departing from the concept of the present invention, and these modifications and improvements all fall into the claimed scope of the present invention. Therefore, the claimed scope of the present invention patent should be subject to the appended claims.

What is claimed is:

1. An integrated intelligent interaction machine, comprising a signal transmission device, a processor, a first network card, an upper computer, a switcher, a second network card, and a wired network control switch, wherein the upper computer includes a wired network interface, a wireless network unit and a switcher unit, and the signal transmission device is connected to the processor;

the switcher unit of the upper computer is connected to the wired network interface, the wireless network unit and the switcher, and is connected to the processor through the first network card;

the wired network interface is used to connect to an external wired network, and the wired network control switch is connected to the switcher and the processor;

the signal transmission device is used to receive the screen transmission signal and transmit the screen transmission signal to the processor, the processor is used to process the screen transmission signal to obtain the screen transmission data, and transmit the screen transmission data to the switcher unit of the upper computer through the first network card;

the switcher unit of the upper computer outputs a network signal to the switcher according to the accessed external wired network and/or external wireless network, the switcher transmits the network signal to the processor through the second network card, and the wired network control switch is used to, according to the control signal transmitted by the processor or a received external switching command, control the on/off of the network signal accessed by the switcher from the external wired network.

2. The integrated intelligent interaction machine according to claim 1, wherein the signal transmission device is a wireless transmission device.

3. The integrated intelligent interaction machine according to claim 2, wherein the wireless transmission device is configured to receive wireless screen transmission signals and transmit the wireless screen transmission signals to the processor, and the processor is configured to decode the wireless screen transmission signals to obtain the screen transmission data and transmits the screen data to the upper computer.

4. The integrated intelligent interaction machine according to claim 2, wherein the signal transmission device is a WIFI® enabled device, a Bluetooth® enabled device, or an infrared device.

5. The integrated intelligent interaction machine according to claim 1, wherein the processor is connected to the signal transmission device through a universal serial bus (USB) interface.

6. The integrated intelligent interaction machine according to claim 1, wherein the first network card is a universal serial bus (USB) network card.

7. The integrated intelligent interaction machine according to claim 1, wherein the second network card is a universal serial bus (USB) network card.

8. The integrated intelligent interaction machine according to claim 1, wherein the wired network interface is an Ethernet interface, and the wired network control switch is an Ethernet control switch.

9. The integrated intelligent interaction machine according to claim 1, wherein the processor is a personal computer (PC), a tablet computer, or a touch computer.

* * * * *